Patented Jan. 15, 1952

2,582,833

UNITED STATES PATENT OFFICE 2,582,833

METHOD FOR THE PREPARATION OF ALUMINUM AND MAGNESIUM SOAPS

James V. Hunn, Avon Lake, Ohio, assignor to The Sherwin-Williams Company, Cleveland, Ohio, a corporation of Ohio No Drawing. Application July 12, 1950,
Serial No. 173,483

14 Claims. (Cl. 260—414)

This invention relates as indicated to an improved method for the preparation of certain soaps of higher fatty acids, and more particularly to anhydrous, salt-free aluminum and magnesium soaps of such higher fatty acids.

Most of the aluminum and magnesium soaps produced today are made by the precipitation or double decomposition process. In accordance with this process the fatty acids are first converted to sodium soaps in water solution, and to this solution is added a soluble aluminum or magnesium salt such as aluminum sulphate or magnesium sulphate, with the consequent precipitation of the corresponding insoluble aluminum and magnesium soaps. The porportion of sodium soap to the soluble metallic salt is varied to produce either theoretically neutral soap or the basic soap. After precipitation, the soaps are filtered and washed to remove entrained soluble salts, thereafter being dried to reduce the water content to the lowest possible value. A major difficulty with soaps so produced is their lack of uniformity and their sensitivity to slight variations in production conditions.

It is well known that aluminum and magnesium can be activated with mercury or mercuric salts so that it will react directly with an alcohol to produce aluminum and magnesium alcoholates. It has also been known that the alcoholates will react with fatty acids to produce metalic soaps. The production of the alcoholates from the activated metal and an alcohol requires a considerable excess of the alcohol because of the voluminous nature of the alcoholates when they form, and the fact that all of the excess alcohol cannot be removed from the alcoholates, an appreciable amount being retained as an addition compound.

It has been found that it is not necessary to convert all the aluminum or magnesium to the alcoholate, e. g., methylate, ethylate, propylate or isopropylate, prior to the introduction of the aliphatic acid whereby at all times during the reaction, except at the termination thereof, there is present aluminum or magnesium metal.

The process of this invention results in the accomplishment of the desirable objectives in that the products therefrom are completely anhydrous and contain no soluble salts. Moreover, a principal advantage of this process is that metallic aluminum and magnesium, which are today the cheapest source of these metals, are used in place of the more expensive sulphates and chlorides. When calculated on the aluminum and magnesium content of such salts, the cost per pound of aluminum or magnesium is higher than the cost of the free metal. For many applications it is also extremely important that water and soluble salt content be at a minimum. Soaps made by the method of this invention are anhydrous and substantially entirely free from soluble or suspended salts. By a modification of the procedure of this invention, the metallic soaps may be formed in solution thereby requiring no subsequent dispersion step. As against the old procedures, the three steps of filtration, washing and drying, are eliminated.

Other objects of this invention will appear as the description proceeds.

To the accomplishment of the foregoing and related ends, said invention, then, consists of the means hereinafter fully described and particularly pointed out in the appended claims, the following description setting forth in detail certain embodiments of the invention, such disclosed means constituting, however, but a few of the various forms in which the principle of my invention may be employed.

Broadly stated, this invention comprises a process for producing aluminum and magnesium salts of aliphatic acids which comprises adding from about 4 to about 20 times the weight of the aluminum or magnesium of a substantially dry aliphatic alcohol of less than 4 carbon atoms, said alcohol containing in solution a trace of a soluble mercury compound, and adding a free aliphatic acid in the diluted or undiluted state. More specifically, this invention comprises a process for producing anhydrous solutions of aluminum and magnesium salts or soaps of higher aliphatic acids which comprises adding to the free metal in a relatively finely divided state, e. g., turnings, foil, or powder, a sufficient amount of a dry aliphatic alcohol to cover the free metal, said aliphatic alcohol containing less than 4 carbon atoms and containing in solution therewith a trace of a soluble mercury salt, and adding to the metal-alcohol mixture a free aliphatic acid in solution in an inert carrier. The amount of acid used is not critical since the reaction will proceed until one or the other of the reactants is exhausted and then cease. Thus acidic, neutral, or basic salts may be produced depending upon the desire of the operator. Acidic products are produced by employing an excess of acid over the theoretical 2 or 3 mols of acid per mol of the metal. Basic products are obtained when there is a deficiency of acid, i. e., less than 2 or 3 mols per mol of metal. Neutral soaps are obtained when theoretical quantities are employed.

Any alcohol may be used in this process that will readily form alcoholates with the aluminum and magnesium metals such as those aliphatic alcohols containing less than 4 carbon atoms, e. g., methyl, ethyl, propyl and isopropyl alcohols. For practical purposes, methanol is preferred because it reacts readily and is low in cost. Methyl alcohol is also supplied commercially in an anhydrous condition which helps to conserve metal in this reaction because all moisture present converts a corresponding amount of alcoholate to the oxide or hydroxide which is not appreciably reactive.

With respect to the aliphatic acids, this process will work with low molecular weight aliphatic acids such as acetic acid as well as it will work with very high molecular weight fatty acids such as fish oil acids containing upwards of 30 carbon atoms. The process is, however, particularly adaptable to the higher molecular weight fatty acids containing from 12 to 24 carbon atoms such as lauric, stearic, dichlorostearic, oleic, palmitic, linoleic, linolenic, cetoleic, abietic, naphthenic, or crude acids such as oxidized petroleum acids, rosin acids or tall oil acids. Fatty acids derived from vegetable oils of the drying, semi-drying, and non-drying types may also be used in accordance with this invention, e. g., soyabean fatty acids, linseed fatty acids, fish oil fatty acids, etc. Hydroxy fatty acids, e. g., hydroxy stearic, dihydroxy stearic, etc. may also be used.

As indicated above, a carrier such as vegetable oil, mineral oil, such as SAE 10, 20, 30, 40, 50, 60, etc., motor oils, mineral spirits, or other inert solvent such as xylene, toluene, benzene and the like, may be used if desired. In many cases the pure soaps which are formed in this reaction are infusible solids at ordinary temperatures and difficultly soluble from that state in the carriers in which they are commonly employed. Accordingly, crushing operations are frequently required or expensive solution methods must be used. It is convenient, therefore, in many instances to employ a diluent, solvent or carrier which will serve to dissolve and carry away the metallic soaps as they are formed. This reaction proceeds smoothly with the elimination of hydrogen until all of the metal has gone into the solution. Any excess of alcohol can then be removed from the reaction products by distillation. In many instances the carrier or solvent that is used will be determined by the end use to which the metallic soaps are to be put. Where the material is to be used as a pigment suspender or water proofing agent, the carrier may be a petroleum distillate such as that known in the paint trade as mineral spirits. The carrier may also be a vegetable oil such as soya or linseed oil if the material is to be used in a paint product. In case the product is desired for use in greases or in lubricating oil, mineral oils may then be incorporated as the carrier. In many cases it is highly desirable that the acyl radical of the oil correspond to the acyl radical of the aluminum or magnesium soap. For example, the aluminum soap of linseed oil fatty acids may be produced in a carrier which consists primarily of linseed oil. By the same token, paint vehicles which contain free fatty acids, that is, have an appreciable acid number, may be contacted with the aluminum metal in the manner set forth in this invention to yield an aluminated vehicle of low acid number and containing in place a highly effective suspending or dispersing agent. Thus alkyds having an appreciable acid number may be contacted with metallic aluminum covered with methyl or ethyl alcohol, for example, containing a trace of a mercury salt such as mercuric chloride or mercuric acetate.

The theory by which this invention works is not well understood, but it is believed that the mercury salt and the alcohol serve in a pseudocatalytic manner; the mercury salt amalgamating an area of the aluminum which in turn reacts with the methyl or ethyl alcohol to form the methylate or ethylate which instantaneously reacts with the free fatty acid present to form the aluminum soap. In the process of forming the methylate or ethylate the mercury is released to further activate the aluminum or magnesium. In the process of forming the soap, the alcohol is released for further reaction with the metal, and the process is repeated. Theoretically, the reaction should go with an extremely small amount of alcohol and mercury salt. However, the speed of reaction becomes impractically slow with too great deficiencies of the alcohol. The principal reason for including larger amounts of alcohol is that the alcohol is soluble in the acid or acid-carrier mixture. The dilution effect minimizes the chances for contact between aluminum or magnesium and alcohol, thereby slowing down the reaction. Thus it is preferred to employ excesses of alcohol for practical operation reasons, and not reasons of stoichiometric requirements.

It has been found that when in the course of the reaction the temperature is suddenly raised to drive off all the alcohol from the reaction mass, the reaction ceases, even though the mercury is still present and has theoretically activated the aluminum or magnesium surface such that it should continue to react with the fatty acid. All evolution of hydrogen ceases under these circumstances and there is no further evidence of dissolution of the aluminum metal.

The products which result from the practice of this invention are remarkably uniform, ranging from homogeneous jelly-like materials to thick, syrupy materials depending largely upon the nature of the acid employed as well as the quantities of reactants and the presence or absence of a diluent or carrier. The authorities are in conflict as to whether the tri-substituted soap can be produced, some authorities insisting that an aluminum soap no higher than the di-soap can be produced, others reporting that the tri-soap has been isolated. Very little is known as to the nature of the soaps produced in accordance with this process, although it is believed that a mixture of mono, di and possibly tri-soaps is produced. It should be noted, however, that whether the soap is mono or di, the remaining valence bonds of the aluminum are not satisfied with hydroxyl radicals since none of such radicals are present in the system. It is accordingly believed that remaining valence bonds of the aluminum, and possibly the magesium, are identified with alkoxy radicals such as methoxy or ethoxy. This is believed to be a contributing factor in the homogeneity of the resulting solutions of soap in the vehicle. Any moisture present in the acid or alcohol components is immediately removed by a portion of the activated metal.

The amount of mercury which is used in accordance with this invention is actually a trace, since amounts ranging from 0.005 up to .5 gram, and preferably from .05 to .1 gram per $\frac{1}{10}$ mol of aluminum may be used. The upper limits in these cases are practical limits and larger amounts of mercury salt may be used if desired, although problems of contamination and removal of mercury are thereby encountered. The term "trace" as used herein and in the appended claims is to be construed as an amount detectable by ordinary analytical methods. Practical quantities are as given above.

It becomes convenient at this point to illustrate the process of this invention by several illustrative examples. It is to be understood that these examples are for illustrative purposes only, i. e., demonstrating the procedural steps involved in the process of this invention and several operative preparations made in accordance therewith, and are not to be construed as limiting the invention to the precise examples shown herein.

*Example I*

2.7 grams of metallic aluminum in the form of turnings or foil were placed in a three necked round bottom flask equipped with agitator, reflux condenser, and means of heating. To this was then added 12 grams of methyl alcohol carrying a trace of mercuric chloride. This amount of alcohol is sufficient to completely cover the aluminum as it rests in the bottom of the flask. The aluminum and alcohol were allowed to stand at room temperature, or they may be gently heated for a few minutes until hydrogen starts to evolve. 84 grams of soya bean fatty acids in 378 grams of mineral spirits were then added. The mixture was then agitated with slow heating to a slight refluxing of the alcohol until all of the aluminum was in solution. At this point the temperature was raised and the excess methyl alcohol distilled off and recovered. The final product when cool was a thick, stringy gel. The molar ratio in this example was 1 mol of aluminum to 3 mols of fatty acid to form a neutral soap.

*Example II*

Following the same procedure, as in Example I, 2.7 grams of aluminum, 23.7 grams of methyl alcohol containing a trace of mercuric chloride, 84 grams of soya bean fatty acids, and 300 grams of S. A. E. #10 motor oil were used. The product obtained in this case was a solid, stiff gel.

*Example III*

Following exactly the same procedure as employed in Example I, 1.5 grams of aluminum metal, 19.8 grams of methyl alcohol containing a trace of mercuric chloride and 28.4 grams of stearic acid in 100 grams of mineral spirits were reacted. The mol ratio of aluminum to stearic acid was changed to 1:2 to produce a basic soap.

*Example IV*

Following again the same procedure as carried out in Example I, 2.7 grams of aluminum metal, 19.8 grams of ethyl alcohol containing a trace of mercuric chloride, and 85.3 grams of stearic acid in 490 grams of alkali refined linseed oil were reacted. The final product was a solid, stiff gel when cool, and which on aging separated and broke into two phases.

*Example V*

Following the same procedure as used in the preceding examples, 2.7 grams of aluminum metal, 19.8 grams of methyl alcohol containing a trace of mercuric acetate, and 84 grams of soya fatty acids together with 300 grams of alkali refined linseed oil were reacted. The resultant product was a stiff gel which did not break on aging.

*Example VI*

Again following the procedure of the preceding examples, 2.4 grams of magnesium metal, 19.8 grams of methyl alcohol activated with mercuric chloride, and 56 grams of soya fatty acid together with 100 grams of mineral spirits were reacted. The mol ratio of magnesium to fatty acid in this case was 1:2 to produce a neutral soap. The product when cool was not a gel, but a thick, sticky, viscous syrup.

*Example VII*

2.7 grams of aluminum, 19.8 grams of methyl alcohol containing a trace of mercuric chloride and 101 grams of rosin in 200 grams of mineral spirits were reacted in accordance with the same procedure. The product obtained was a viscous solution.

*Example VIII*

2.7 grams of aluminum, 67.4 grams of rosin, 19.8 grams of methyl alcohol containing mercuric chloride and 200 grams of mineral spirits were reacted as in the preceding examples. The difference in this case was that the mol ratio of aluminum to rosin was 1:2 to form a basic soap. The product obtained by this example was not a gel, but a viscous solution.

*Example IX*

2.7 grams of aluminum, 30 grams of ethyl alcohol containing a trace of mercuric chloride and 75 grams of naphthenic acid were reacted in the presence of 200 grams of mineral spirits, in accordance with the procedure given above. This product was a thick, sticky, viscous syrup.

The foregoing examples demonstrate the rather simple procedure of this invention which involves primarily the steps of covering the free metal with a low molecular weight alcohol containing a trace of a soluble mercury salt, and then adding the fatty acid to the mixture as a straight acid or diluted with an inert material. By "inert material" is meant a diluent, solvent, or carrier, which is not chemically reactive to any substantial degree with the reactants or the products of reaction under the conditions of the reaction. The reaction may be carried out at reflux temperatures, or at any other temperature above or below this point so long as decomposition temperatures are not employed. The time of reaction depends to a large extent upon the temperature, generally being markedly less at elevated temperatures and unduly long at temperatures below room temperature. Reflux temperatures are to be preferred. Although the reaction is ordinarily and conveniently conducted at atmospheric pressure, sub-atmospheric pressures or super-atmospheric pressures may be employed. Moreover, the reaction mass may, in certain instances, be blanketed with an inert gas, such as nitrogen. Air is generally excluded from the reaction zone anyway by the release of hydrogen. This is a distinct advantage, particularly where drying oils are used as a diluent or carrier for the soap and unnecessary exposure to air is to be avoided. Agitation is helpful in speeding up the reaction by promoting contact between the reactants as is also the provision of a large reactive surface area, particularly with respect to the metals. Powdered aluminum or magnesium is more reactive than foil or ribbon, and the latter more reactive than chips or blocks. Any form of the metal may be used, however, depending upon the available time for reaction.

The alcohol, acid, and carrier, if any, are desirably as nearly anhydrous as possible, since any moisture present, while readily removed in the reaction, represents a waste of material and necessitates a clean-up step.

Any mercury salt, organic or inorganic, which is soluble to the extent of a trace in the alcohol may be used in this invention. The examples have shown the use of mercuric chloride and mercuric acetate. However, mercuric bromide, mercuric iodide, mercuric fluosilicate, mercuric iodobromide, mercuric iodochloride, mercuric nitrate, mercuric thiocyanate, etc. may be used. Soluble mercurous salts such as mercurous chlorate may also be used. Such mercury salts are preferably in the unhydrated form, although with the minor amount which is used in these reactions, the added water of hydration will be almost insignificant.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for producing aluminum and magnesium salts of aliphatic acids which comprises the steps of admixing a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding a free aliphatic acid, and reacting said mixture to produce a substantially anhydrous product.

2. A process for producing aluminum and magnesium salts of aliphatic acids which comprises the steps of admixing a metal selected from the group consisting of aluminum and magnesium with from about 4 to about 20 times times the weight of the metal of a substantially dry, aliphatic alcohol of less than 4 carbon atoms, said alcohol containing in solution a trace of a soluble mercury compound, adding a free aliphatic acid and an inert carrier for the resultant soap, and reacting said mixture to produce a substantially anhydrous product.

3. A process for producing aluminum and magnesium salts of aliphatic acids containing from 12 to 24 carbon atoms which comprises the steps of admixing a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding the free aliphatic acid, and reacting said mixture to produce a substantially anhydrous product.

4. A process in accordance with claim 1 in which the aliphatic acid is a drying oil fatty acid.

5. A process in accordance with claim 2 in which the aliphatic acid is a drying oil fatty acid.

6. A process for producing aluminum and magnesium salts of aliphatic acids in solution in mineral oil which comprises the steps of admixing a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding a free aliphatic acid and a mineral oil carrier for the resultant soap, and reacting said mixture to produce a substantially anhydrous product.

7. A process for producing aluminum and magnesium salts of the residual aliphatic acids in a varnish which comprises covering a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding the residual acid-containing varnish, and reacting said mixture to produce a substantially anhydrous product.

8. A process for producing aluminum and magnesium salts of the residual acids in an alkyd varnish which comprises covering a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding the acid-containing alkyd thereto, and reacting said mixture to produce a substantially anhydrous product.

9. The process of producing an aluminum soap of an aliphatic acid of from 12 to 24 carbon atoms which comprises adding to aluminum from about 4 to about 20 times the weight of the metal of substantially dry methyl alcohol containing in solution a trace of mercuric chloride, adding the free aliphatic acid thereto, and stripping off the residual alcohol at the completion of the reaction.

10. A process in accordance with claim 1 in which the aliphatic acid comprises rosin acids.

11. A process in accordance with claim 1 in which the aliphatic acid comprises tall oil acids.

12. A process of producing aluminum and magnesium salts of aliphatic acids which comprises the steps of admixing a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding a chemically equivalent amount of a free aliphatic acid, and reacting said mixture to produce a substantially anhydrous product.

13. A process for producing basic aluminum and magnesium salts of aliphatic acids which comprises the steps of admixing a metal selected from the group consisting of aluminum and magnesium with from about 4 to about 20 times the weight of the metal of a substantially dry, aliphatic alcohol of less than 4 carbon atoms, said alcohol containing in solution a trace of a soluble mercury compound, adding less than a chemically equivalent amount of a free aliphatic acid, and reacting said mixture to produce a substantially anhydrous product.

14. A process in accordance with claim 2 in which the inert carrier is a mineral oil.

JAMES V. HUNN.

REFERENCES CITED

The following references are of record in the file of this patent:

UNITED STATES PATENTS

| Number | Name | Date |
| --- | --- | --- |
| 2,397,767 | Taylor | Apr. 2, 1946 |
| 2,409,678 | Hamblet | Oct. 22, 1946 |
| 2,416,074 | Weber | Feb. 18, 1947 |
| 2,423,619 | Roon | July 8, 1947 |
| 2,477,296 | Georgi | July 26, 1949 |